(12) United States Patent
Maeda et al.

(10) Patent No.: US 7,043,339 B2
(45) Date of Patent: May 9, 2006

(54) REMOTE MONITORING SYSTEM FOR AIR CONDITIONERS

(75) Inventors: Tsutomu Maeda, Gunma (JP); Tsuyoshi Kawai, Uji (JP); Yoshio Ozawa, Hirakata (JP)

(73) Assignee: Sanyo Electric Co., Ltd., (JP)

( * ) Notice: Subject to any disclaimer, the term of this patent is extended or adjusted under 35 U.S.C. 154(b) by 43 days.

(21) Appl. No.: 10/864,385

(22) Filed: Jun. 10, 2004

(65) Prior Publication Data

US 2005/0038567 A1    Feb. 17, 2005

Related U.S. Application Data

(63) Continuation-in-part of application No. 09/820,170, filed on Mar. 29, 2001, now abandoned.

(30) Foreign Application Priority Data

Mar. 29, 2000  (JP)  .............................. 2000-092401

(51) Int. Cl.
*G05D 23/00* (2006.01)

(52) U.S. Cl. ..................................... 700/276
(58) Field of Classification Search ............... 700/2–5, 700/8–10, 19–21, 28, 32, 275–277
See application file for complete search history.

(56) References Cited

U.S. PATENT DOCUMENTS

| | | | |
|---|---|---|---|
| 5,282,127 A | 1/1994 | Mii | |
| 5,909,378 A | 6/1999 | De Milleville | |
| 6,008,733 A | 12/1999 | Okano et al. | |
| 6,064,310 A * | 5/2000 | Busak et al. | 340/588 |
| 6,385,510 B1 | 5/2002 | Hoog et al. | |
| 6,546,419 B1 * | 4/2003 | Humpleman et al. | 709/223 |
| 6,658,091 B1 * | 12/2003 | Naidoo et al. | 379/37 |
| 6,795,799 B1 * | 9/2004 | Deb et al. | 702/188 |
| 6,889,173 B1 * | 5/2005 | Singh | 702/188 |
| 6,891,838 B1 * | 5/2005 | Petite et al. | 370/401 |
| 2002/0019725 A1 * | 2/2002 | Petite | 702/188 |
| 2002/0161555 A1 * | 10/2002 | Deb et al. | 702/188 |
| 2003/0195640 A1 * | 10/2003 | Krocker et al. | 700/26 |
| 2004/0095237 A1 * | 5/2004 | Chen et al. | 340/506 |
| 2005/0103874 A1 * | 5/2005 | Erdman, Jr. | 236/51 |

* cited by examiner

*Primary Examiner*—Maria N. Von Buhr
(74) *Attorney, Agent, or Firm*—Rader, Fishman & Grauer PLLC

(57) ABSTRACT

This invention provides a remote monitoring system for air conditioners installed respectively in a plurality of buildings for concentrically monitoring the operating state of the air conditioners from a distance. The system comprises data collectors 3 installed in the respective buildings, and a remote monitor 4 connected to the data collectors 3 of all the buildings via a communication network. Each of the data collectors 3 collects state data representing the operating state of the air conditioner installed in each building and transmits the collected state data to the remote monitor 4. The remote monitor 4 receives the state data collected by each data collector 3, diagnoses the operating state of the air conditioner installed in each building based on the received state data, and outputs the result of diagnosis. In this way, the air conditioners can be optimally adjusted within a short period of time.

2 Claims, 5 Drawing Sheets

REMOTE MONITORING SYSTEM FOR AIR CONDITIONERS

RELATED APPLICATION

This application is a Continuation-In-Part Application of application Ser. No. 09/820,170 filed on Mar. 29, 2001 now abandoned.

FIELD OF THE INVENTION

The present invention relates to a system for concentrically monitoring from a distance the operating state of air conditioners installed in a plurality of buildings, respectively.

BACKGROUND OF THE INVENTION

To adjust the room temperature and humidity of a building by an air conditioner, it is conventional practice to install one or a plurality of outdoor units on the rooftop of the building or externally of the building and one or a plurality of indoor units in each room of the building and to control the operation of the outdoor units and the indoor units in accordance with the outdoor temperature and humidity.

For example after the air conditioner is started up, the indoor units and the outdoor units of the air conditioner have their operations so controlled as to cause the temperature of each room to agree with a target temperature rapidly, to maintain the room temperature at the target level as much as possible and to cause the room temperature to rapidly reach an altered temperature if the target temperature is altered. Further in order to realize air conditioning by efficient heat exchange, the refrigerant is so controlled as to adjust the rate of flow of the refrigerant into the evaporator or condenser.

The operating conditions for such air conditioners vary, for example, with the environmental conditions of the building wherein the conditioner is installed or the orientation of the room to be air conditioned, hence the need for the adjustment of each operating condition. Accordingly, the air conditioner is operated for trial when the air conditioner is newly installed in the building so as to adjust the control parameters such as the gain to obtain an optimum operating state.

However, since the operating conditions for air conditioners are influenced by the season and weather, it is necessary for those who are in charge-of installation of the conditioner to visit the site of installation repeatedly to collect state data representing the operating state of the air conditioner during trial operations, check various adjusting values for acceptability based on the state data and make readjustment of the air conditioner. Accordingly, the air conditioner has the problem of necessitating a prolonged period of time and great labor for adjustment. This problem becomes more serious in the case of air conditioners which are installed in a plurality of buildings since the conditioner in each building needs to be adjusted.

SUMMARY OF THE INVENTION

An object of the present invention is to provide a system which is capable of optimally adjusting air conditioners installed in buildings, easily within a short period of time.

The present invention provides a remote monitoring system for air conditioners installed respectively in a plurality of buildings 6 for concentrically monitoring the operating state of the air conditioners from a distance. The system comprises data collectors 3 installed in the respective buildings 6, and a remote monitor 4 connected to the data collectors 3 of all the buildings 6 via a communication network 5. Internet, telephone network or the like is usable as the communication network 5.

Each of the data collectors 3 comprises data collecting means for collecting state data representing the operating state of the air conditioner installed in each building 6, and transmitting means for transmitting the collected state data to the remote monitor 4. The remote monitor 4 comprises receiving means for receiving the state data collected by each data collector 3, diagnosing means for diagnosing the operating state of the air conditioner installed in each building 6 based on the received state data, and output means for outputting the result of diagnosis of the air conditioner.

With the remote monitoring system of the present invention, the remote monitor 4 is installed, for example, in a building of an air conditioner installation company. The air conditioner installed in each building 6 of the user side is operated for trial to automatically collect state data representing the operating state of the air conditioner, for example, variations in outdoor atmospheric temperature and humidity, indoor temperature and humidity, compressor drive frequency and fan rotational speed. The collected state data is transmitted to the remote monitor 4 of the installation company. The remote monitor 4 receives the state data forwarded from each building 6, prepares diagnosis data, such as the deviation of the indoor temperature from a target temperature, diagnoses the operating state of the air conditioner installed in the building 6, and delivers the result of diagnosis of the air conditioner to a display, printer or the like.

The adjuster then determines adjusting values of control parameters necessary for improving the operating state of each air conditioner with reference to the result of diagnosis of the air conditioner output from the remote monitor 4. When required, the adjuster thereafter goes to the building 6 and adjusts the air conditioner of the building 6 based on the adjusting values of control parameters.

Thus, the control parameters of the air conditioners are optimized by the addition to the air conditioner remote monitoring system the function of diagnosing the operating state and the function of outputting the result of diagnosis to the display, printer or the like.

Stated more specifically, the remote monitor 4 further comprises input means for inputting one or a plurality of control parameters determined based on the result of diagnosis of the air conditioner in each building 6, and transmitting means for transmitting the control parameters input for the air conditioner of the building 6 to the data collector 3 of the building 6. The data collector 3 further comprises receiving means for receiving the parameters transmitted to the data collector 3, and adjusting means for setting the received control parameters in the air conditioner and thereby adjusting the operating state thereof.

With the system having the construction described above, the control parameters determined by the adjuster for each air conditioner are input to the remote monitor 4, which in turn transmits the input control parameters to the data collector 3 of each building 6. The data collector 3 receives the control parameters forwarded from the remote monitor 4 and sets the received control parameters in the air conditioner. The operating state of the air conditioner is automatically adjusted in this way. With use of the construction described, the adjuster need not go to the site of installation of the air conditioner for adjustment.

Thus, the air conditioner remote control system having the function of diagnosing the operating state and the function of outputting the result of diagnosis is additionally given the function of inputting the control parameters determined by the adjuster from the result of diagnosis and the function of transmitting the control parameters to the data collector of each building, with the data collector given the function of receiving the control parameters and the function of adjusting the control parameter settings of the air conditioner, whereby the control parameters for the air conditioner can be optimized easily from a distance.

Further according to another specific construction, the diagnosing means of the remote monitor 4 prepares a candidate value or candidate values for one or a plurality of control parameters required for improving the operating state based on the result of diagnosis of the air conditioner, and the output means outputs the candidate value or values prepared as the result of diagnosis. With this specific construction, a candidate value or candidate values of at least one control parameter for each air conditioner are output as the result of diagnosis, so that the adjuster determines an optimum control parameter based on the parameter candidate values. The control parameter candidate values can be prepared automatically based, for example, on a knowledge database showing the relationship between the result of diagnosis of the air conditioner and the control parameter candidate values.

The air conditioner remote monitoring system having the function of optimizing control parameters of air conditioners from a distance not only diagnoses the operating state but also has the function of preparing optimum control parameter candidate values for improving the operating state based on the result of diagnosis and outputting the candidate values. This makes it easy for the adjuster to determine optimum control parameters.

In adjusting the operating states of air conditioners installed in buildings by the air conditioner remote monitoring system of the present invention, the adjuster can obtain the results of diagnoses of the operating states of the air conditioners concentrically at the location where the remote monitor is installed. The adjuster therefore need not go to the site of installation of the air conditioner for diagnosis but, when required, may go to the site only once for actual adjustment after the determination of optimum adjusting values. This assures facilitated optimum adjustment of the air conditioners within a short period of time.
BRIEF

DETAILED DESCRIPTION OF EMBODIMENT

Figure 1:
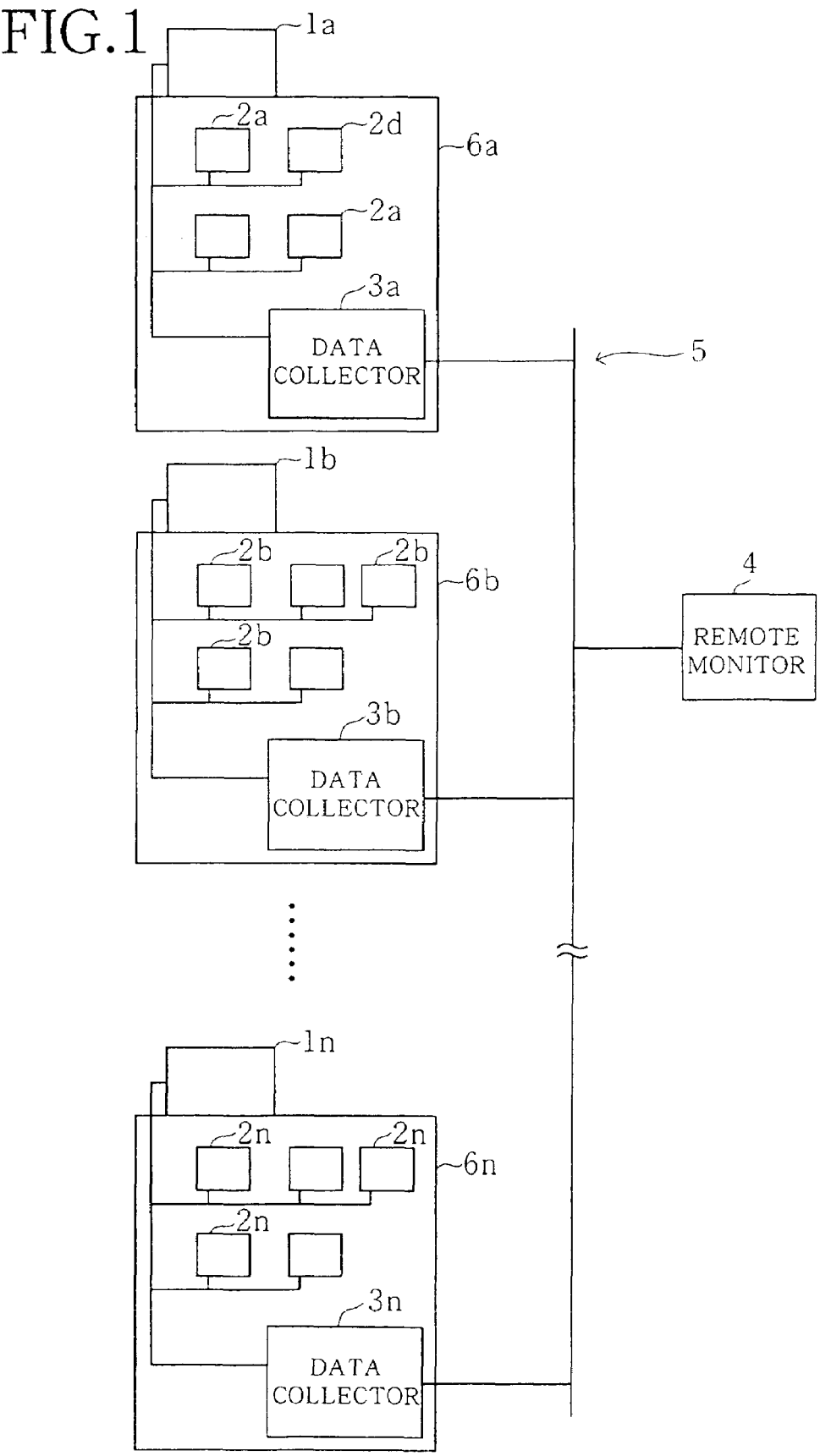
FIG. 1 is a block diagram showing the construction of a remote monitoring system of the invention for air conditioners.

A detailed description will be given of an embodiment of the present invention with reference to the drawings. The remote monitoring system of the invention is adapted for use with air conditioners. As shown in FIG. 1, a plurality of buildings 6a, 6b, . . . , 6n have one or a plurality of outdoor units 1a, 1b, . . . , 1n installed on the rooftop of the building and one or a plurality of indoor units 2a, 2b, . . . , 2n installed in a room or rooms thereof. The buildings 6a, 6b, . . . , 6n are provided with data collectors 3a, 3b, . . . , 3n for collecting state data representing the operating state of the outdoor unit and indoor unit installed in the building. The data collectors 3a, 3b, . . . , 3n of the buildings 6a, 6b, . . . , 6n are connected to a remote monitor 4 installed in the building of the air conditioner installation company via internet, telephone network or like communication network 5.

Figure 2:
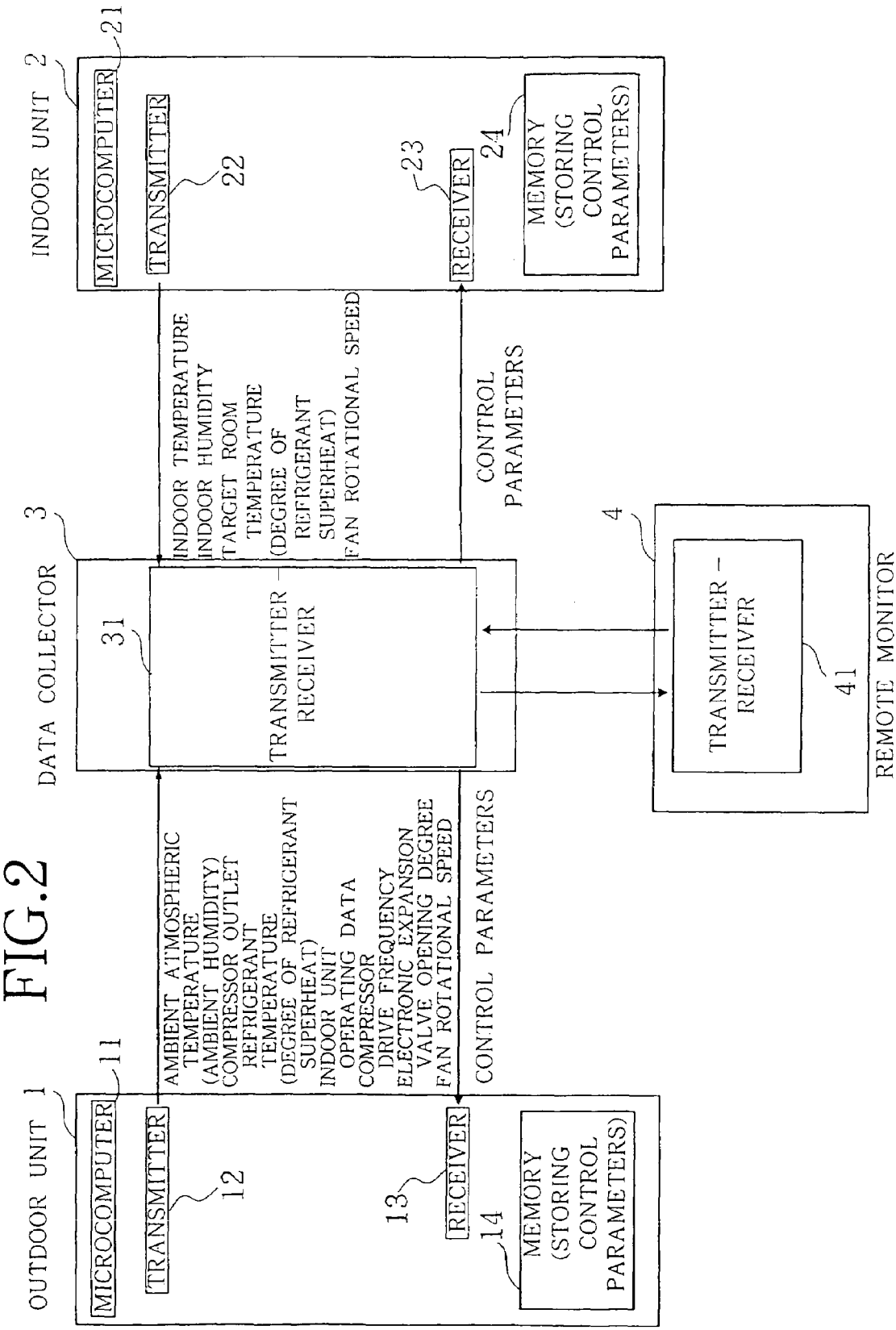
FIG. 2 is a block diagram showing the flow of data between an outdoor unit, indoor unit, data collector and remote monitor.

The outdoor unit 1 shown in FIG. 2 has incorporated therein a microcomputer 11 and a memory 14, and the microcomputer 11 controls the operation of the outdoor unit 1 based on a plurality of control parameters stored in the memory 14. The outdoor unit 1 further has a transmitter 12 and a receiver 13 for conducting communication with the data collector 3. On the other hand, the indoor unit 2 has incorporated therein a microcomputer 21 and a memory 24, and the microcomputer 21 controls the operation of the indoor unit 2 based on a plurality of control parameters stored in the memory 24. The indoor unit 2 further has a transmitter 22 and a receiver 23 for conducting communication with the data collector 3.

The data collector 3 has incorporated therein a transmitter-receiver 31 for conducting communication with the outdoor unit 1, indoor unit 2 and remote monitor 4. The remote monitor 4 has incorporated therein a transmitter-receiver 41 for conducting communication with the data collector 3. The transmitter-receiver 31 of the data collector 3 receives the state data forwarded from the transmitter 12 of the outdoor unit 1 or the transmitter 22 of the indoor unit 2, and transmits the state data to the remote monitor 4.

Examples of state data to be transmitted from the outdoor unit 1 to the data collector 3 are ambient atmospheric temperature, ambient humidity, compressor outlet refrigerant temperature, degree of refrigerant superheat, indoor unit operating data, compressor drive frequency, electronic expansion valve opening degree, fan rotational speed, etc. The degree of refrigerant superheat is calculated from the refrigerant temperatures at two points within the evaporator during heating operation. The indoor unit operating data is the data as to the operation of the indoor unit, such as the number of indoor units in operation among the indoor units connected to the outdoor unit. Further examples of state data to be transmitted from the indoor unit 2 to the data collector 3 are indoor temperature, indoor humidity, target room temperature, degree of refrigerant superheat, fan rotational speed, etc.

As a specific instance of control, room temperature control will be considered below with use of the PI control method for controlling the indoor temperature to the target temperature during cooling operation. In controlling the operation of the air conditioner in this case, refrigerant control can also be effected, for example, with use of data as to refrigerant superheat, whereas for the convenience of description, the following description will be given with reference to room temperature control.

The transmitter-receiver 41 of the remote monitor 4 receives state data forwarded from the data collector 3 of each building, and thereafter transmits a plurality of control parameters input by the adjuster for the air conditioner of the building to the data collector 3 of the building. Examples of control parameters to be transmitted to the indoor units 1 and the outdoor units 2 are amplifier gain, proportional coefficient, integral coefficient and differential coefficient for PID control, various parameters for fuzzy control or neuro control, etc.

The transmitter-receiver 31 of the data collector 3 transmits the control parameters received from the remote monitor 4 to the outdoor unit 1 and the indoor unit 2, with the result that the control parameters stored in the memories 14, 24 of the outdoor unit 1 and the indoor unit 2 of the building are updated to adjust the operating state of the outdoor unit 1 and indoor unit 2 with the parameters.

Figure 3:
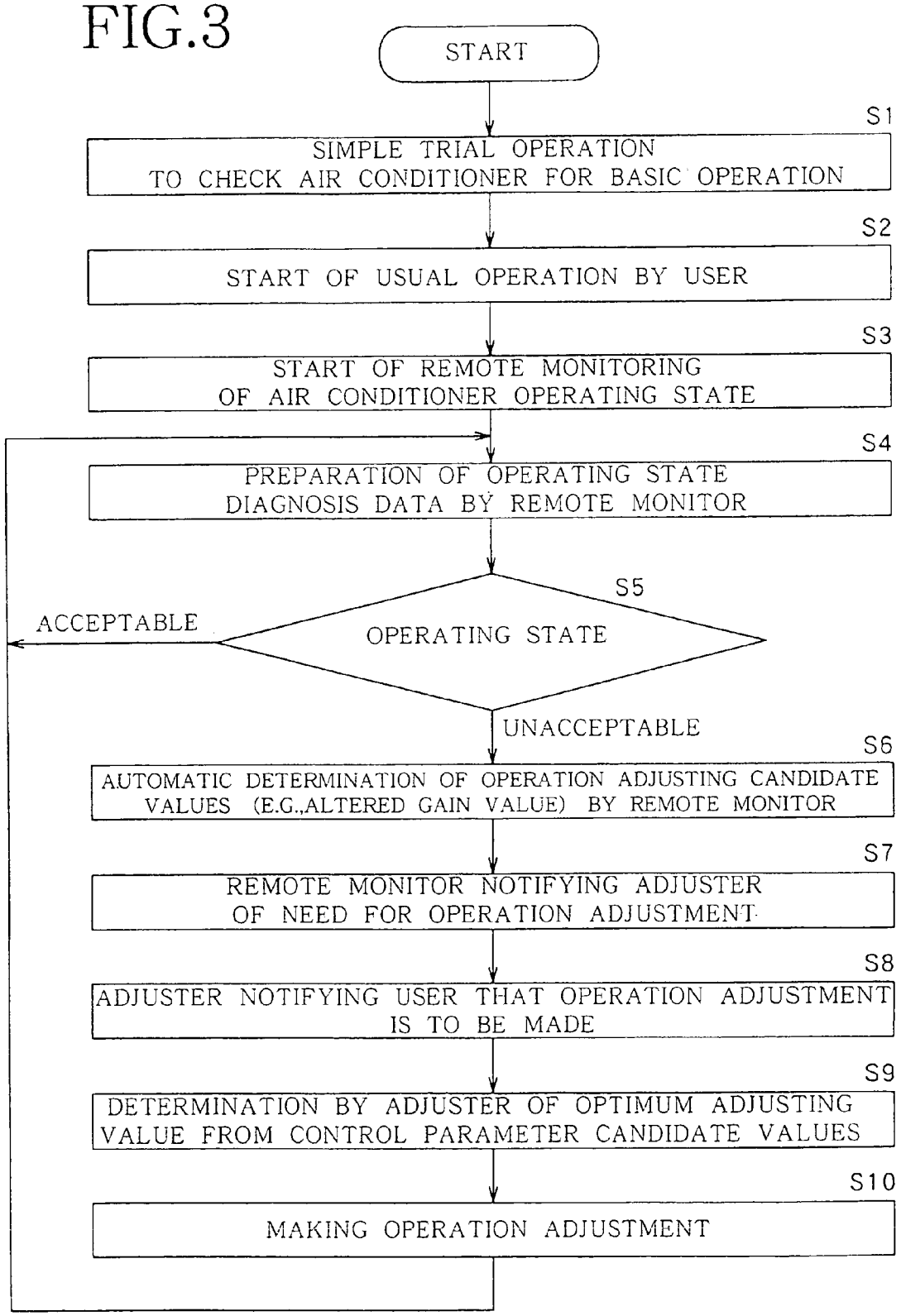
FIG. 3 is a flow chart showing an adjustment procedure for a trial operation.

FIG. 3 shows the operation adjusting procedure to be performed in a trial operation of the air conditioner installed in one building 6. The air conditioner is first operated simply for trial in step S1 and checked for basic operation, and initiated into usual operation by the user in step S2. Subsequently in step S3, the data collector starts to collect state data and the remote monitor starts to monitor the operating state. Diagnosis data as to the operating state is prepared in step S4 from the state data received. In checking the operating state for acceptability, for example, when a deviation, in excess of a predetermined value, of the indoor temperature from the target temperature continues for more than a specified period of time, this state is diagnosed as developing an abnormality. Further occurrence of an abnormality can be diagnosed when time-series variations in other state data are found to involve an abnormality.

In the case where the room temperature is controlled during cooling operation by the PI control method, the operating state is diagnosed by the method to be described in detail below. The operating state is diagnosed in this case based on the time taken for the room temperature to decrease to the target temperature from the start of the indoor unit and on the degree of agreement of the room temperature with the target temperature. However, since these two indexes are influenced by the outdoor and indoor atmospheric temperatures and humidities, the operating state is diagnosed with consideration given to the environmental conditions of the building. Stated more specifically, if the time taken for the room temperature to drop to the target temperature is long and when the degree of agreement therebetween is poor, the poor degree is judged from the viewpoint of the environmental conditions. Further as another method of diagnosing the operating state, measurements of the time taken for the decrease to the target temperature and the degree of agreement are stored as classified according to the combination of ambient conditions to judge the operating state as becoming impaired if the two indexes are worse than the corresponding stored measurements under the same combination of ambient conditions.

The operating state is checked for acceptability in step S5 based on the diagnosis data. If the state is found acceptable, step S4 follows again to repeat the preparation of diagnosis data. On the other hand, if the operating state is not found acceptable in step S5, step S6 follows, in which the remote monitor automatically determines control parameter candidate values which are necessary for the adjustment of operation. Step S7 thereafter notifies the adjuster of the need for operation adjustment.

In determining the candidate values of control parameters, the control parameters are so altered as to afford higher cooling or heating ability, while a plurality of candidate values are given for each control parameter from the viewpoint of energy saving. Usable in altering the control parameter are, for example, a method of identifying the item to be controlled from the state data received from the data collector and calculating a control parameter suitable for the identified item by simulation, and a method of analyzing the state data received from the data collector and deriving a suitable control parameter using a knowledge database having collected therein instances of control performed in the past for other buildings or past experience of the adjuster.

A method of deriving a control parameter will be described in detail for use in controlling the room temperature by the PI control method during cooling operation. The proportional coefficient of the PI control method is generally increased in the case where it take a long period of time for the room temperature to drop to the target temperature after starting the indoor unit. The integral coefficient of the P1 control method is generally increased in the case where the room temperature fails to reach the target temperature because of a poor degree of agreement between the target temperature and the room temperature. However, if the time taken for the room temperature to drop to the target temperature is shorter, generally impaired is the degree of agreement, whereas if the degree of agreement is higher, the time taken for the temperature drop tends to become longer. Accordingly, a plurality of control parameter values are derived, and the adjuster finally determines which of the two indexes is to be used in preference.

In step S8, the adjuster informs the user that operation adjustment is to be made. Further in step S9, an optimum adjustment value is determined from candidate values for one or a plurality of control parameters output from the remote monitor. The adjuster thereafter inputs the determined adjusting value to the remote monitor, whereupon the monitor transmits the input adjustment value to the data collector. The operation of the outdoor unit and indoor unit is adjusted in step S10 based on the received control parameter adjusting value. Step S4 then follows again to repeat the preparation of diagnosis data.

In the case where the operating state diagnosing means and the control parameter deriving means are provided on the building side to automatically adjust the control parameters for the air conditioner on the building side, there is a possibility of resulting in variations in the operating state which are unexpectable by the user. For this reason, it is important for the adjuster to make contact with the user to obtain the user's permission before the adjustment as in the present embodiment, hence the need for the remote monitoring system of the invention.

Figure 4:
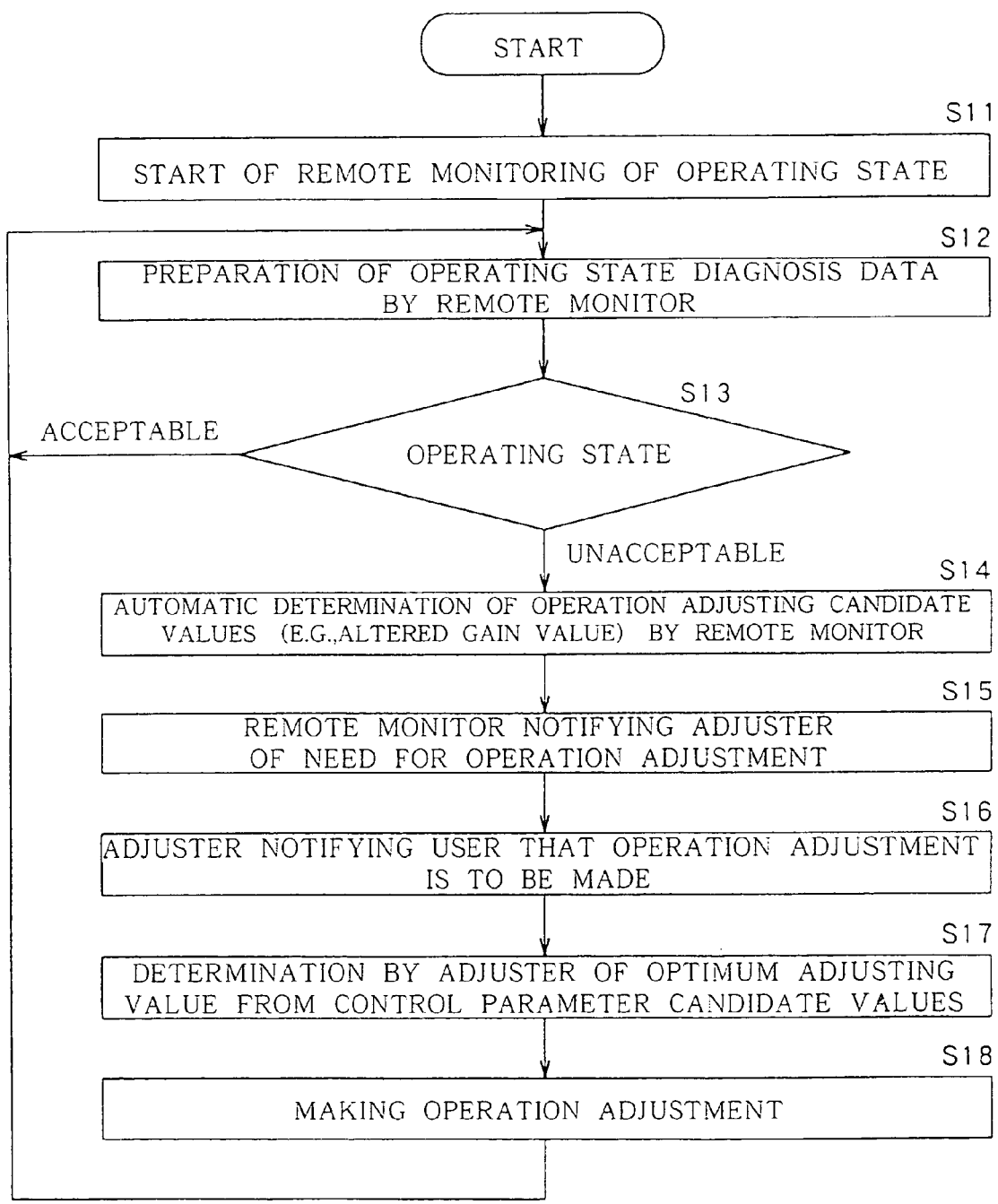
FIG. 4 is a flow chart showing an adjustment procedure for the usual operation.

FIG. 4 shows the operation adjusting procedure to be performed in the usual operation of the air conditioner installed in the building 6. In step S11, the data collector starts to collect state data and the remote monitor starts to monitor the operating state. Diagnosis data as to the operating state is prepared in step S12 from the state data received. The operating state is checked for acceptability in the next step S13 based on the diagnosis data. If the state is found acceptable, step S12 follows again to repeat the preparation of diagnosis data. On the other hand, if the operating state is found unacceptable in step S13, step S14 follows, in which the remote monitor automatically determines control parameter candidate values which are necessary for the adjustment of operation. Step S15 further notifies the adjuster of the need for operation adjustment.

In step S16, the adjuster informs the user that operation adjustment is to be made. Further in step S17, an optimum adjustment value is determined from candidate values for one or a plurality of control parameters output from the remote monitor. The adjuster thereafter inputs the determined adjusting value to the remote monitor, whereupon the monitor transmits the input adjustment value to the data collector. The operation of the outdoor unit and indoor unit is adjusted in step S18 based on the received control parameter adjusting value. Step S12 then follows again to repeat the preparation of diagnosis data.

With the remote monitoring system of the present invention, the adjuster makes contact with the user before the adjustment of control parameters and the adjustment is made after obtaining the user's permission as already stated, so that it is unlikely that variations unexpectable by the user will occur in the operating state of the air conditioner. Further when the operating state becomes impaired owing to age deterioration, adjustment is made after making contact with the user. This makes it possible to receive compensation from the user for the effect of the adjustment.

Control parameters of the outdoor unit 1 and the indoor unit 2 are adjusted through the adjustment procedure of FIG. 3 performed during the trial operation, and optimum control is performed as suited to the environment of the building 6, orientation of the room, etc. Further through the adjustment procedure of FIG. 4 subsequently performed during the usual operation, it is possible to correct the deviations in adjusting values, for example, due to age deterioration or introduction of a heat source device into the room.

In adjusting control parameters of air conditioners installed in respective building 6, the state data of the air conditioners is made available to the adjuster by the remote monitor 4 of the remote monitoring system of the invention as described above, so that there is no need for the adjuster to go to the site of installation of the conditioner for collecting state data of the air conditioner. Moreover, since the diagnosis data as to the air conditioners is made available to the adjuster by the remote monitor 4, the control parameters of the air conditioners are optimally adjustable easily based on the diagnosis data.

The remote monitoring system for air conditioners is used by at least one user and is installed respectively in the plurality of buildings for concentrically monitoring the operating state of the air conditioners from a distance. The system includes the data collectors 3 installed in the respective buildings 6 and a remote monitor 4 connected to the data collectors 3 of all the buildings 6 via a communication network 5.

Figure 5:
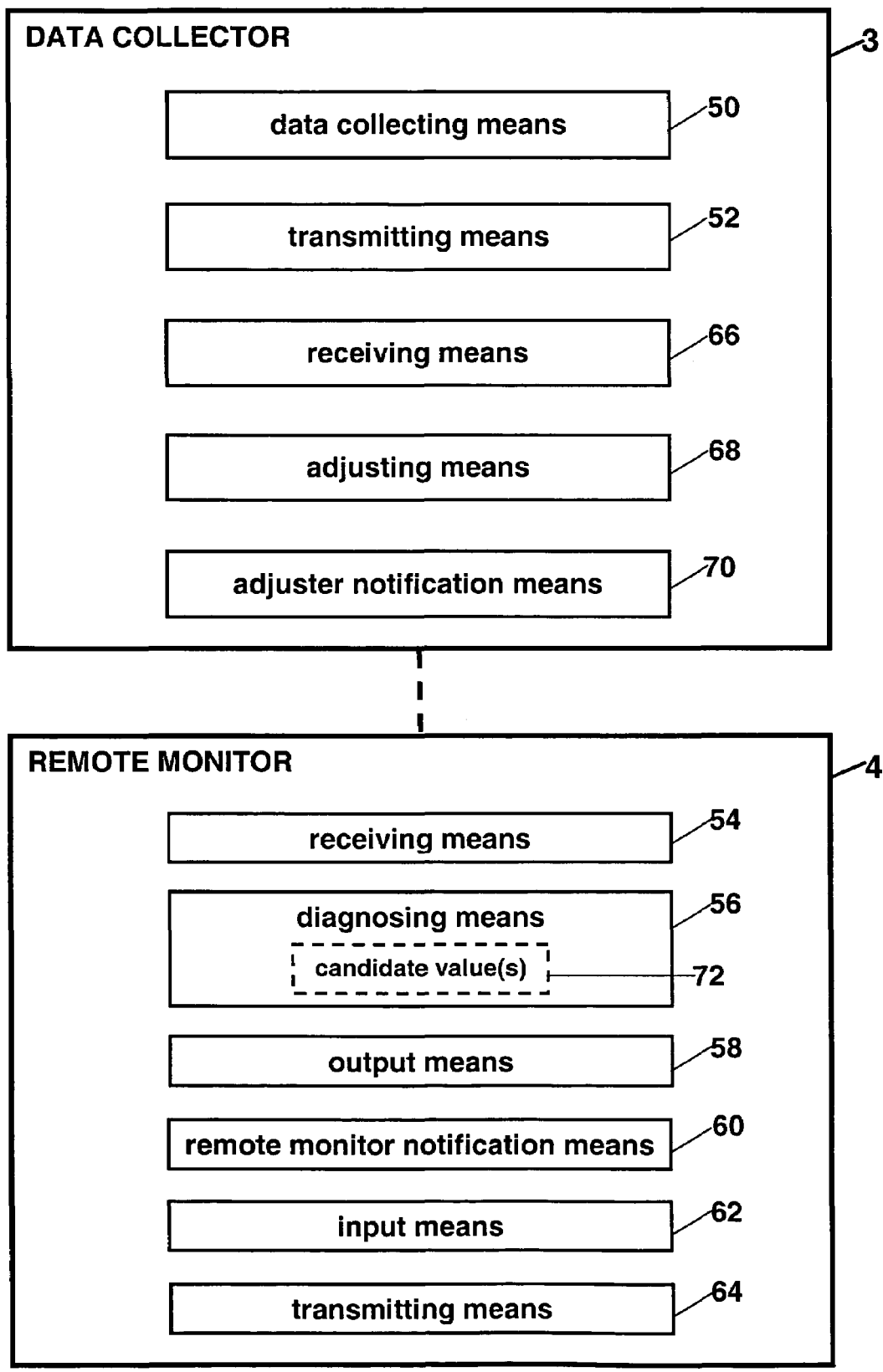
FIG. 5 is a block diagram showing the construction of the remote monitoring system of the invention for air conditioners specifically identifying its components and the operation thereof.

As illustrated in FIG. 5, each of the data collectors 3 includes data collecting means 50 for collecting state data representing the operating state of the air conditioner installed in each building 6 and transmitting means 52 for transmitting the collected state data to the remote monitor 4. The remote monitor 4 includes receiving means 54 for receiving the state data collected by each data collector 3, diagnosing means 56 for diagnosing the operating state of the air conditioner installed in each building 6 based on the received state data, output means 58 for outputting the result of diagnosis of the air conditioner and remote monitor notification means 60. Further, the remote monitor 4 also includes input means 62 for inputting one or a plurality of control parameters determined based on the result of diagnosis of the air conditioner in each building 6 and transmitting means 64 for transmitting the control parameters input for the air conditioner of the building to the data collector of the building. Further, data collector 3 includes receiving means for receiving the parameters transmitted to the data collector 3, adjusting means 68 for setting the received control parameters in the air conditioner and thereby adjusting the operating state thereof and adjuster notification means 70 such that the remote monitor notification means 60 notifies the adjusting means 68 of a need for operation adjustment. Thereafter, the adjuster notification means 70 notifies the at least one user that operation adjustment is to be made and, upon receipt of permission by the at least one user, the adjusting means 68 adjusts the operating state.

More specifically, the diagnosing means 56 of the remote monitor 4 prepares a candidate value or candidate values 72 for one or a plurality of control parameters required for improving the operating state based on the result of diagnosis of the air conditioner. The output means 58 outputs the candidate value or values 72 prepared as the result of diagnosis and the adjusting means 68 sets the received control parameters in the air conditioner for adjusting the operating state thereof such that the remote monitor notification means 70 notifies the adjusting means 68 of a need for operation adjustment and thereafter the adjuster notification means 70 notifies the at least one user that operation adjustment is to be made and, upon receipt of permission by the at least one user, the adjusting means 68 adjusts the operating state.

What is claimed is:

1. A remote monitoring system for air conditioners used by at least one user and installed respectively in a plurality of buildings for concentrically monitoring the operating state of the air conditioners from a distance, the system comprising data collectors installed in the respective buildings, and a remote monitor connected to the data collectors of all the buildings via a communication network, each of the data collectors comprising:

data collecting means for collecting state data representing the operating state of the air conditioner installed in each building, and transmitting means for transmitting the collected state data to the remote monitor, the remote monitor comprising:

receiving means for receiving the state data collected by each data collector, diagnosing means for diagnosing the operating state of the air conditioner installed in each building based on the received state data, output means for outputting the result of diagnosis of the air conditioner, and remote monitor notification means, wherein the remote monitor further comprises input means for inputting one or a plurality of control parameters determined based on the result of diagnosis of the air conditioner in each building, and transmitting means for transmitting the control parameters input for the air conditioner of the building to the data collector of the building, the data collector further comprising receiving means for receiving the parameters transmitted to the data collector, adjusting means for setting the received control parameters in the air conditioner and thereby adjusting the operating state thereof and adjuster notification means such that, if the result of the diagnosis of the air conditioner in each building indicates a need for operational adjustment, the remote monitor notification means notifies the adjusting means of the need for operation adjustment and, after the adjusting means is notified of the need for operational adjustment by the remote monitor notification means, the adjuster notification means notifies the at least one user that operation adjustment is to be made and, upon receipt of permission by the at least one user, the adjusting means adjusts the operating state.

2. A remote monitoring system for air conditioners used by at least one user and installed respectively in a plurality of buildings for concentrically monitoring the operating state of the air conditioners from a distance, the system comprising data collectors installed in the respective buildings, and a remote monitor connected to the data collectors of all the buildings via a communication network, each of the data collectors comprising:
  data collecting means for collecting state data representing the operating state of the air conditioner installed in each building,
  transmitting means for transmitting the collected state data to the remote monitor,
  receiving means for receiving the parameters transmitted to the data collector,
  adjusting means for setting the received control parameters in the air conditioner and thereby adjusting the operating state thereof, and
  adjuster notification means,
  the remote monitor comprising:
  receiving means for receiving the state data collected by each data collector,
  diagnosing means for diagnosing the operating state of the air conditioner installed in each building based on the received state data, and
  output means for outputting the result of diagnosis of the air conditioner, and
  remote monitor notification means,
  wherein the diagnosing means of the remote monitor prepares a candidate value or candidate values for one or a plurality of control parameters required for improving the operating state based on the result of diagnosis of the air conditioner, and the output means outputs the candidate value or values prepared as the result of diagnosis and wherein the adjusting means sets the received control parameters in the air conditioner for adjusting the operating state thereof such that, if the result of the diagnosis of the air conditioner in each building indicates a need for operational adjustment, the remote monitor notification means notifies the adjusting means of the need for operation adjustment and, after the adjusting means is notified of the need for operational adjustment by the remote monitor notification means, the adjuster notification means notifies the at least one user that operation adjustment is to be made and, upon receipt of permission by the at least one user, the adjusting means adjusts the operating state.

* * * * *